US006747380B2

(12) United States Patent
Bernreuther et al.

(10) Patent No.: US 6,747,380 B2
(45) Date of Patent: Jun. 8, 2004

(54) DIRECT WINDING WIRE TO EXTERNAL CONDUCTOR CONNECTED MULTI-PHASE MOTOR

(75) Inventors: Georg Bernreuther, Nuremberg (DE); Gerhard Bopp, Nuremberg (DE); Frank Hilberg, Kassel (DE)

(73) Assignee: Bühler Motor GmbH, Nürnberg (DE)

( * ) Notice: Subject to any disclaimer, the term of this patent is extended or adjusted under 35 U.S.C. 154(b) by 0 days.

(21) Appl. No.: 09/773,549

(22) Filed: Feb. 1, 2001

(65) Prior Publication Data

US 2002/0047364 A1 Apr. 25, 2002

(30) Foreign Application Priority Data

Feb. 1, 2000 (DE) ......................... 100 04 059

(51) Int. Cl.$^7$ ..................... H02K 11/00; H02K 7/00; H02K 17/00; H02K 19/00; H02K 21/00
(52) U.S. Cl. ..................... 310/71; 310/68 R; 310/66; 310/273; 310/40 R; 310/208; 310/254
(58) Field of Search ............... 310/273, 71, 68 R, 310/66, 40 R, 10, 208, 254, 216, 218, 249

(56) References Cited

U.S. PATENT DOCUMENTS

| | | | | |
|---|---|---|---|---|
| 3,644,872 A | * | 2/1972 | Russo, Jr. ............... 439/849 |
| 4,147,398 A | * | 4/1979 | Lill ......................... 310/71 |
| 4,241,965 A | * | 12/1980 | Wilson et al. ............ 439/31 |
| 4,361,773 A | * | 11/1982 | Mokrzycki .............. 310/71 |
| 4,367,370 A | * | 1/1983 | Wilson et al. ............ 174/48 |
| 4,382,648 A | * | 5/1983 | Propst et al. ............ 439/209 |
| 4,523,116 A | * | 6/1985 | Dibbern et al. .......... 310/71 |
| 4,616,149 A | | 10/1986 | Best ........................ 310/71 |
| 4,649,304 A | * | 3/1987 | Atherton et al. ........ 310/71 |
| 4,656,378 A | * | 4/1987 | Atherton et al. ........ 310/71 |
| 4,684,840 A | * | 8/1987 | Bertram et al. ......... 310/162 |
| 4,688,869 A | * | 8/1987 | Kelly ....................... 439/209 |
| 4,720,646 A | * | 1/1988 | Torimoto ................. 310/71 |
| 4,806,813 A | * | 2/1989 | Sumi et al. ............... 310/254 |
| 4,845,393 A | * | 7/1989 | Burgess et al. .......... 310/51 |
| 4,851,725 A | * | 7/1989 | Keck ....................... 310/71 |
| 4,958,099 A | * | 9/1990 | Chigira et al. .......... 310/254 |
| 5,039,896 A | * | 8/1991 | Adams et al. ........... 310/71 |
| 5,057,732 A | * | 10/1991 | Fukaya ..................... 310/208 |
| 5,104,332 A | * | 4/1992 | McCoy ..................... 439/290 |
| 5,117,137 A | * | 5/1992 | Kobayashi ............... 310/49 R |
| 5,118,977 A | * | 6/1992 | Bertram et al. .......... 310/49 R |
| 5,122,696 A | * | 6/1992 | Shih et al. ............... 310/71 |
| 5,132,877 A | * | 7/1992 | Branan et al. ........... 361/736 |
| 5,175,458 A | * | 12/1992 | Lemmer et al. ......... 310/71 |
| 5,189,327 A | * | 2/1993 | Ootsuka et al. ......... 310/71 |
| 5,204,565 A | * | 4/1993 | Sekine et al. ............ 310/71 |
| 5,264,816 A | * | 11/1993 | Degenhart et al. ...... 336/192 |
| 5,304,880 A | * | 4/1994 | Hisada et al. ........... 310/71 |
| 5,410,450 A | * | 4/1995 | Iida et al. ................. 361/736 |
| 5,656,878 A | * | 8/1997 | Nakata ..................... 310/71 |

(List continued on next page.)

FOREIGN PATENT DOCUMENTS

DE 199 09 227 10/1999

*Primary Examiner*—Karl Tamai
*Assistant Examiner*—Pedro J. Cuevas
(74) *Attorney, Agent, or Firm*—Jacobson Holman PLLC

(57) ABSTRACT

Multi-phase motor, in particular, stepping motor or synchronized motor, with a rotor and stator parts that are essentially arranged concentrically with respect to the rotor and that, in each case, have a core and a coil, consisting of winding wire, and wound up upon the core, as well as a plug part with plug pins or a printed circuit board with strip conductors for electrical connection to a power supply source, where the winding wires essentially are connected directly to the plug pins or the strip conductors and where, between each coil and the plug part or the printed circuit board, there is provided an electrically insulating connecting piece which receives a section of the pertinent winding wire.

7 Claims, 5 Drawing Sheets

U.S. PATENT DOCUMENTS

| | | | |
|---|---|---|---|
| 5,659,213 A | 8/1997 | Imashiro et al. | 310/71 |
| 5,697,769 A * | 12/1997 | Kobman et al. | 417/410.1 |
| 5,734,212 A * | 3/1998 | Uffelman | 310/51 |
| 5,747,897 A | 5/1998 | Iwasa et al. | 310/49 R |
| 5,770,902 A * | 6/1998 | Batten et al. | 310/71 |
| 5,825,115 A * | 10/1998 | Kronenberg et al. | 310/254 |
| 5,861,689 A * | 1/1999 | Snider et al. | 310/71 |
| 5,894,179 A * | 4/1999 | Filla et al. | 310/71 |
| 5,949,167 A * | 9/1999 | Blalock et al. | 310/71 |
| 6,031,730 A * | 2/2000 | Kroske | 361/784 |
| 6,048,219 A * | 4/2000 | Kotowski | 439/221 |
| 6,237,213 B1 * | 5/2001 | Braun et al. | 29/596 |
| 6,297,572 B1 * | 10/2001 | Sunaga et al. | 310/68 R |
| 6,317,332 B1 * | 11/2001 | Weber et al. | 361/760 |
| 6,404,083 B1 * | 6/2002 | Muhrer et al. | 310/71 |
| 6,422,534 B1 * | 7/2002 | Fujita et al. | 251/129.11 |
| 6,429,553 B1 * | 8/2002 | Taniguchi et al. | 310/67 R |
| 6,429,557 B2 * | 8/2002 | Sheeran et al. | 310/71 |
| 6,441,520 B1 * | 8/2002 | Grant | 310/68 R |
| 6,445,097 B1 * | 9/2002 | Zeiler et al. | 310/71 |
| 6,445,104 B1 * | 9/2002 | Sato | 310/239 |
| 6,501,201 B1 * | 12/2002 | Whitener et al. | 310/71 |
| 6,541,883 B2 * | 4/2003 | Uffelman | 310/71 |
| 6,542,378 B2 * | 4/2003 | Jacobsen | 361/784 |
| 6,587,338 B2 * | 7/2003 | LaCroix et al. | 361/688 |

* cited by examiner

DIRECT WINDING WIRE TO EXTERNAL CONDUCTOR CONNECTED MULTI-PHASE MOTOR

FIELD OF THE INVENTION

The present invention relates to a multi-phase motor, in particular, a stepping motor or a synchronized motor.

BACKGROUND OF THE INVENTION

Such multi-phase motors are used in accentuating drives, particularly, for heating, ventilation or air conditioning valves, for the purpose of mixing warm air and cold air and to distribute air flows. Applications are known where more than ten such drives are to be housed in a comparatively compact device—for example, an air conditioning system. The requirements for the structural space used, for the reliability and the permissible production costs are correspondingly high.

In known multi-phase motors of this kind, the stator coils are connected by means of connecting arrangements, that have several connecting points, with a plug part for electrical connection to a power supply source. In these connecting arrangements, there are, as a rule, three contact points per pole; in a connection with guide conducting plates, for example, one finds the following contact areas: plug pin/guide conducting plate, guide conducting plate/contact pin, and contact pin/winding wire. A multi-phase motor with a guide conducting plate arrangement, to provide connection between plug contacts and the winding wires of several coils, for example, is known, for example, from DE 19909227A1.

The connection in the individual contact areas is established by soldering, welding, clamping, spraying attachment, or other known techniques. Each of these connection techniques entails a failure risk and the establishment of several connections calls for a relatively great effort in terms of production engineering and is therefore costly. The existence of a plurality of separate parts in such a connection arrangement further increases the costs of making the motor.

SUMMARY OF THE INVENTION

The object of the present invention is to provide an improved multi-phase motor of the type mentioned here which will be distinguished especially by reduced production costs and greater reliability.

The invention includes the essential idea that calls for reducing the number of connecting points or contact areas to the external connection of the coil wires (winding wires) of the stator parts. It furthermore includes the idea of achieving this reduction by connecting the winding wire essentially directly to the conductor that establishes the external connection, in particular, a plug pin or also a strip conductor of a printed circuit board. One therefore deliberately refrains from the usual provision of guide conducting plates with additional contact pins or connection elements.

Besides, the invention includes the idea of providing, by means of a suitable connecting piece, a mechanically stable connection—that protects the connection section of the coil wire—between the actual coil body and the contact element that leads to the outside.

In a practical embodiment, the coils in each case have a coil carrier that is made either integrally with a particular connecting piece or that is connected with it at least so that it will not move. The connection can basically also be separable—for example, it can be executed as a plug connection—but, it must in every case, ensure mechanical protection for the winding wire section located thereupon or therein.

In another preferred embodiment of a multi-phase motor with plug part for external power supply of the present invention, each connecting piece is made integrally with a pin strip that holds the particular plug pins or it is at least firmly connected with it. This connection also features the fact that is not necessarily inseparable but that, when the motor is in use, it must withstand mechanical stresses from the winding wire. In a particularly preferred manner, the coil carrier, the connecting piece, and the pin strip are made integrally with each other.

The connecting pieces as well as the coil carriers and pin strips consist of an electrically insulating material, in particular, a structural synthetic material that is customary in electrical engineering/electronics.

One can achieve a structure that is particularly simple to make and mechanically stable in the following manner: the coil carrier of one of the coils is made integrally with the pertinent connecting piece and a plug housing.

In an alternate, also easily made embodiment, one of the pin strips—by means of a catch connection—carries a separately made plug housing.

A simple production of the individual coil connection element sub-assemblies and their precise and, simultaneously, easy assembly is facilitated by a preferred embodiment where—in the plug part or one of the plug pins—there is firmly attached a first plurality of plug pins and where a second plurality of plug pins (which, in turn, is firmly affixed in a separate pin strip) is positioned in a separable manner. In otherwise, in the plug part or the first-mentioned pin strip, there are provided passage openings for the plug pins of the second pin strip and, in the latter, engage the plug pins of the second pin strip during assembly. As a rule, in such an arrangement, the second plug pins will not have the same length as the first ones; depending on the specific geometry of the motor structure, they will, in particular, be definitely longer than the latter.

The first and second plurality of plug pins is, in particular, arranged in a row. In a 3-phase motor, each row then comprises three plug pins.

According to the above, the coil or winding wires are essentially directly connected to the pertinent plug pins or strip conductors of a printed circuit board. That also includes the connection via an active or passive electrical structural member, in particular, a diode.

The electrical connection can be established in a substance-locking manner, in particular, by welding, soldering, or gluing with a conducting adhesive. In an alternate embodiment, this can involve a form-locking and/or force-locking connection that is formed, for instance by clamps.

The coil carriers preferably are in each case made in one part and have a slit-opening in which the coil body is retained particularly by an undercut or a catch connection.

In an embodiment with practical significance, the multiphase motor has two stator parts and, accordingly, two coils with corresponding connection pieces for the guidance or retention of the particular coil wire sections.

In a first preferred embodiment of the connection pieces, the latter have a wire duct, in otherwise, a long-drawn-out guide, in which the corresponding winding wire section is received.

In another embodiment, the connecting pieces are executed in the form of an insulation material core on which the particular winding wire section (essentially without enveloping sections) lies exposed on an outside surface.

The proposed multi-phase motor has a motor housing which is made integrally—in a practical embodiment—with a plug housing.

The structure of the essential functional components of the motor is such—that is to say, of the rotor and the stator parts, in particular, the stator coils—is familiar to one of ordinary skill in the art and, for example, is consistent with the structure described in DE 199 09 227 A1.

BRIEF DESCRIPTION OF THE DRAWINGS

The advantageous and practical aspects of the invention, will, by the way, emerge from the following description of a preferred embodiment, based on the figures.

DETAILED DESCRIPTION OF THE PREFERRED EMBODIMENTS

Figure 1:
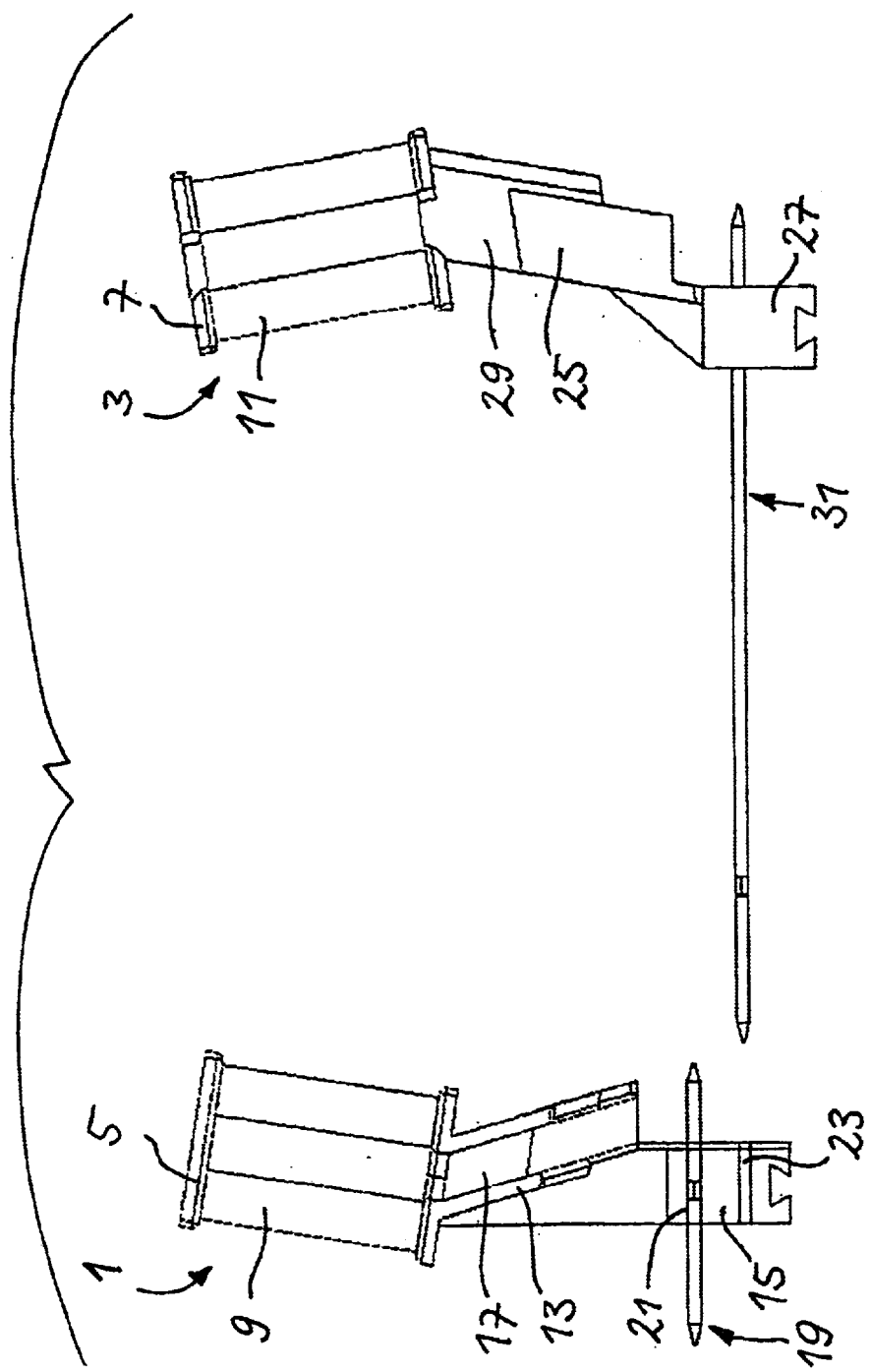
FIG. 1 shows a side view of two stator parts of a multi-phase motor according to an embodiment of the invention, in each case, with connecting piece and pin strip.

The figures display various views of a stator arrangement—consisting of two stator parts 1 and 3 with pertinent connection means—of a stepping or synchronized motor. Stator parts 1 and 3, each, have a plastic coil carrier 5 or 7 that comprises a stator core (not visible in the figures), which, in the usual manner, consists of punch-pocketed plates that are layered on top of each other, as well as a coil 9 or 11 wound up on them.

A first plastic connection piece 13, as well as a plug part or a first pin strip 15 are molded, integrally, upon the plastic coil carrier 5 of the first stator part 1. In the plastic connection piece 13 runs a winding wire section 17 of the winding wire of coil 9 from the latter to the first plug pins 19 that are firmly inserted in pin strip 15. Plastic connecting strip 13 has a shape that is tangent-bent several times and that—as one can see in FIG. 5—is chosen so that it will fit in with the 3-dimensional arrangement of stator part 1 in the housing of the multi-phase motor with relation to a plug part that is molded upon the housing. The winding wire sections 17 are firmly connected to plug pins 19 on pin strip 15 in an electrically conducting manner. In particular, they are soldered together or they are welded together. In addition to the passage pour holes 21—in which the plug pins 19 are firmly inserted—the pin strip 15 also has another row of passage pour holes 23 whose function will be explained below.

Also molded upon plastic coil carrier 7 of the second stator part 3, there is a plastic connecting piece 25 upon whose end—facing away from coil carrier 7—there is molded a second pin strip 27. In analogy to the execution of the connecting means of the first stator part 1, here, again, the plastic connecting piece 25 receives winding wire sections 29 of the winding wire of coil 11, which run toward plug pins 31 that are firmly attached in pin strip 27. The connections between the winding wire sections 29 and plug 31 is made in the same manner as in the case of the first stator part 1. The second plastic connecting piece 25 is also adapted, in terms of its shape, by multiple tangent-bends, to the position of the pertinent stator part 3, with relation to the plug, in the motor housing.

Figure 3:
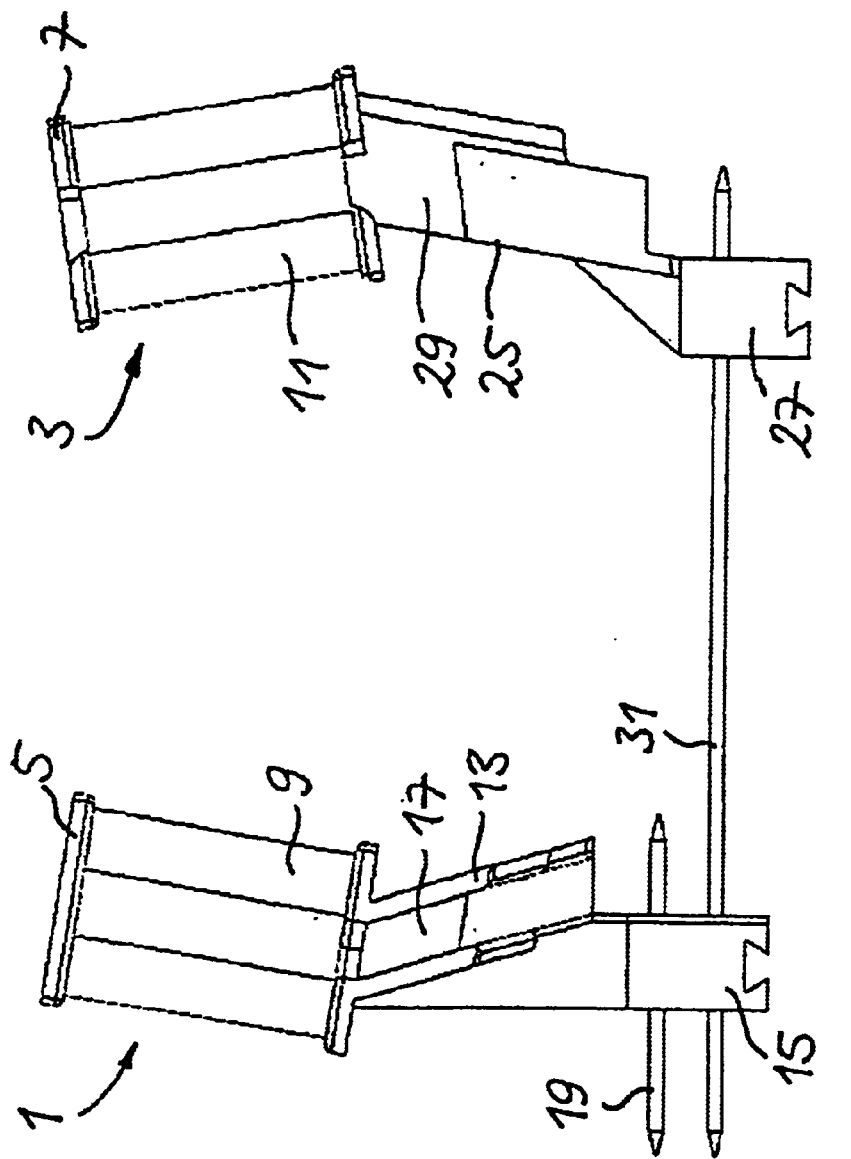
FIG. 3 is a side view of the stator parts according to FIGS. 1 and 2, in the assembled state.
Figure 4:
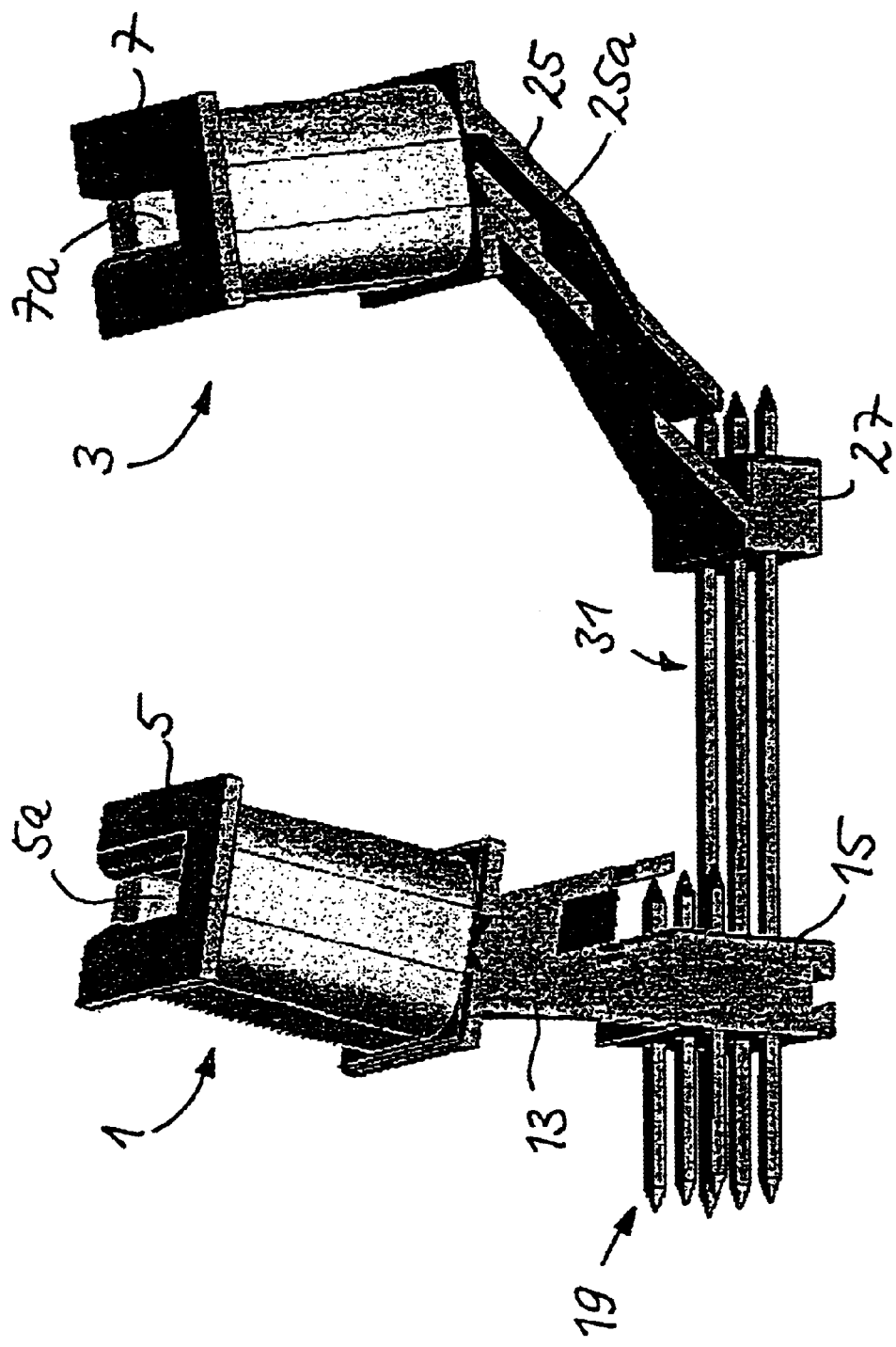
FIG. 4 is a perspective view of the arrangement according to FIG. 3.

As one can see in FIGS. 3 and 4, the two stator parts 1, 3 are connected with each other, via the plug pin group 31 of the second stator part, in such a manner that the plug pin group 31 firmly attached in the second pin strip 27, will be introduced into the passage openings 23 of the first pin strip 15, until they protrude, at the other end of the pin strip, as far out of the latter as the plug pins 19 that are firmly inserted there primarily. A two-row arrangement, consisting of three plug pins 19, 31, thus protrudes out of pin strip 15, in a state where the first and second stator part 1, 3 are connected to each other.

Figure 2:
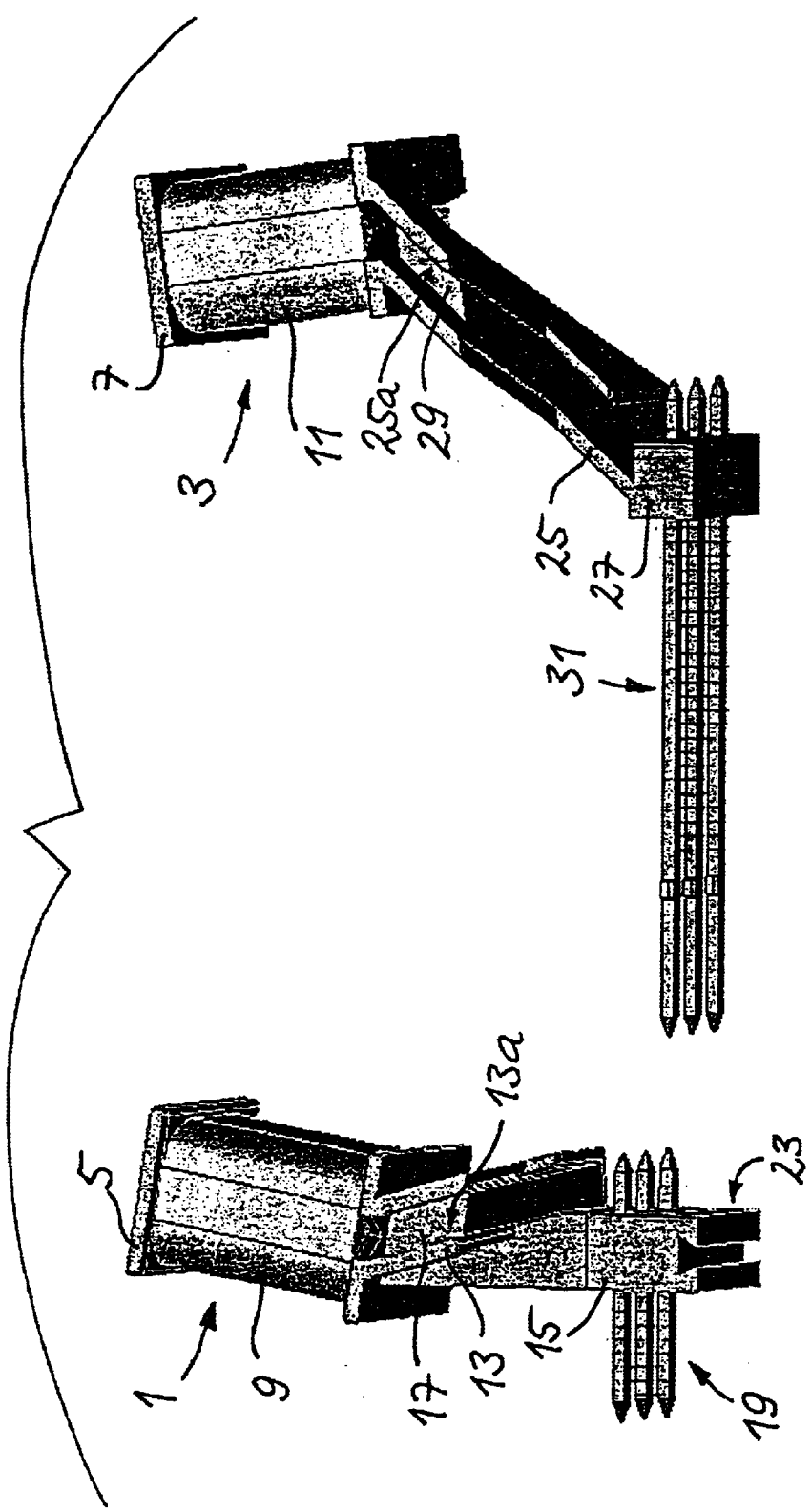
FIG. 2 is a perspective view of the stator parts according to FIG. 1.

In FIG. 2 one can easily see that the plastic connecting pieces 13, 25, in each case, have a winding wire duct 13a, 25a, delimited by side walls, in which duct are guided and mechanically protected the winding wire sections 17, 29 that establish the connection to the plug pins, 19, 31. In FIG. 4, one can see that the plastic coil carriers 5, 7, in each case, have a slit 5a, 7a, and that pertinent stator plate packets—in the ready-assembled condition (not shown in the figures)— are received approximately in a U-shaped arrangement.

Figure 5:
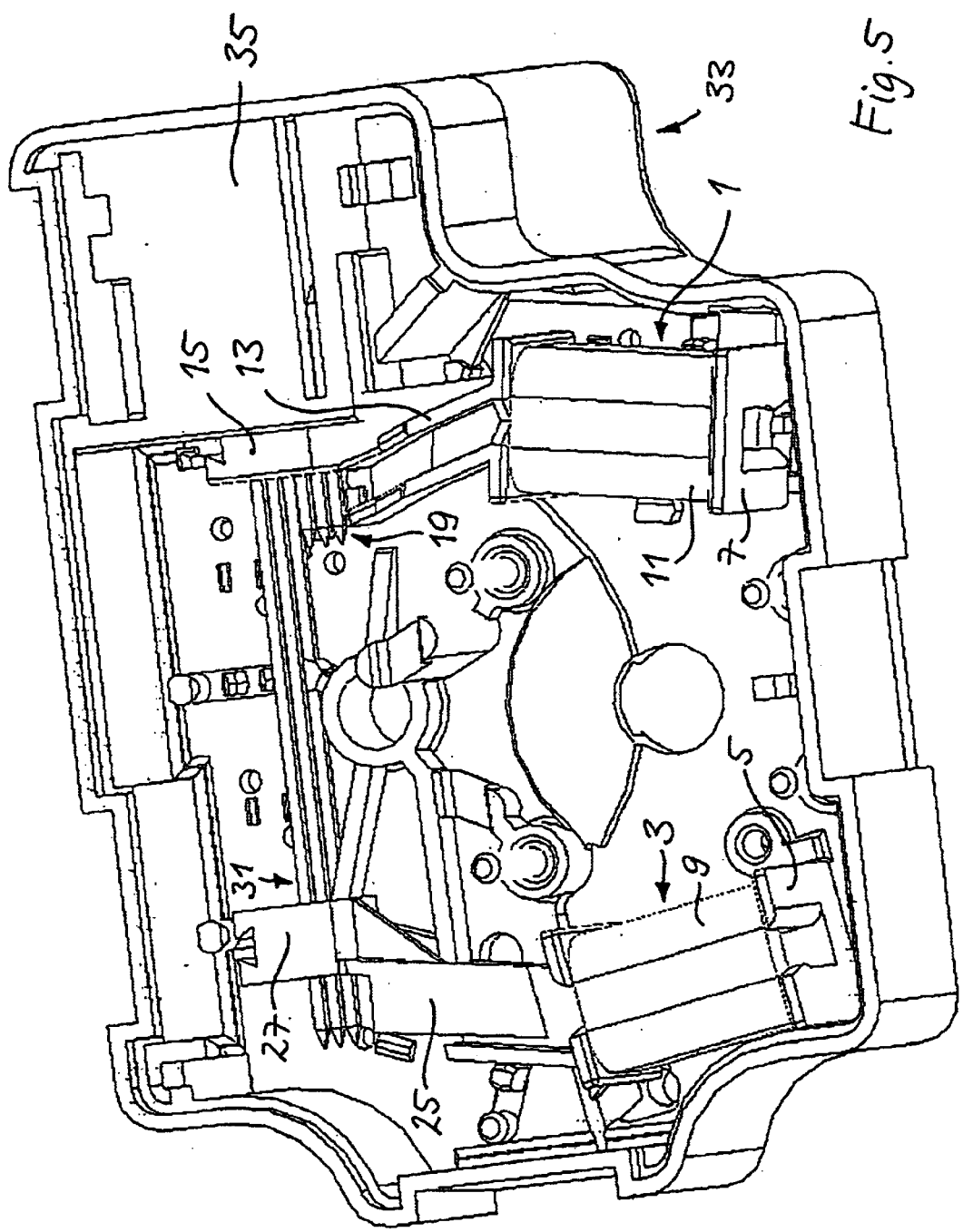
FIG. 5 is a perspective view of the motor housing with the inserted stator part arrangement according to FIGS. 1 to 4.

FIG. 5 illustrates the arrangement of stator parts 1, 3 in a plastic motor housing 33 with integrally molded-form plug housing 35. The individual parts of motor-housing 33 are not of any major significance in conjunction with the invention so that they will not be described here. It is merely pointed out that pin strip 15 directly engages plug housing 35 and that the ends of plug pin groups 19, 31—protruding out of pin strip 15—represent connecting pins in the plug housing.

The execution of the invention is not confined to this, above-described example, but can also feature a plurality of modifications that are within the scope of technically appropriate action. Such modified embodiments were referred to already earlier in a general manner. In a supplementary fashion, it is noted that the coil carriers can be suitably modified, in terms of their shape, to receive additional passive or active electrical structural members, in particular, also for a surface-mounted-device assembly of such structural members. The connecting pieces and/or the pin strips can be so modified in terms of their shape that it will be possible to establish a direct connection to a plate carrying electrical parts or a comparable carrier medium (according to known arrangements of mechatronics). In such a modified arrangement, one can mostly freely select the position of the contact points so that, in an advantageous manner, one gets degrees of freedom for the layout of the motor and structural member arrangement.

We claim:

1. A multi-phase motor for use with a power supply source, the multi-phase motor comprising:

a plurality of stator parts, each of the plurality of stator parts including a plug part having plug pins and a pin strip conductor for electrical connection to the power supply source, a first plurality of said plug pins being firmly attached in only one plug part and a second plurality of said plug pins being firmly attached in another plug part, said second plurality of plug pins also being removably retained in said one plug part, each of the plurality of stator parts including a coil carrier having a winding wire connected directly to one of the plug pins, an electrically insulating connecting piece extending between each coil carrier and each plug part and having a winding wire section and a winding wire guide duct for receiving the winding wire extending from the coil carrier and being connected to the one of the plug pins, each coil carrier being integral with the respective electrically insulating connecting piece and the respective plug part, and said one plug part including passage openings for receipt of the second plurality of said plug pins of said another plug part.

2. The multi-phase motor according to claim 1, wherein one of the pin strips holds a plug housing by a catch connection.

3. The multi-phase motor according to claim 1, wherein the first and second plurality of plug pins are arranged in one row.

4. The multi-phase motor according to claim 1, wherein the coil carriers are made in one part.

5. The multi-phase motor according to claim 1, wherein there are two coils with corresponding connecting pieces.

6. The multi-phase motor according to claim 5, wherein in at least one part of the connecting pieces, the winding wire section lies exposed on an outside surface.

7. The multi-phase motor according to claim 1, wherein a motor housing is made integrally with a plug housing.

* * * * *